United States Patent
Lee et al.

(10) Patent No.: US 7,342,740 B1
(45) Date of Patent: *Mar. 11, 2008

(54) IN-SITU COMPENSATION METHOD OF MICROACTUATOR STROKE SENSITIVITY SUBJECT TO TEMPERATURE VARIATION

(75) Inventors: Dong-Jun Lee, San Jose, CA (US); Young Hoon Kim, Cupertino, CA (US); Hyung J. Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 3 days.

This patent is subject to a terminal disclaimer.

(21) Appl. No.: 11/586,971

(22) Filed: Oct. 25, 2006

(51) Int. Cl.
*G11B 5/596* (2006.01)
(52) U.S. Cl. .................................. 360/78.05
(58) Field of Classification Search ............. 360/78.05, 360/78.12, 31, 55, 234.7, 75, 78.04
See application file for complete search history.

(56) References Cited

U.S. PATENT DOCUMENTS

| | | | | |
|---|---|---|---|---|
| 6,791,786 B2 * | 9/2004 | He et al. | .................. | 360/78.05 |
| 6,829,119 B2 * | 12/2004 | Bonin et al. | ............. | 360/78.12 |
| 7,072,134 B1 * | 7/2006 | Hirano et al. | .................. | 360/55 |
| 7,075,748 B2 * | 7/2006 | White et al. | ............. | 360/78.05 |
| 7,079,338 B1 * | 7/2006 | Semba et al. | .................. | 360/31 |
| 7,079,339 B1 * | 7/2006 | Semba et al. | .................. | 360/31 |
| 7,106,552 B2 * | 9/2006 | Hirano et al. | ............ | 360/78.05 |
| 7,265,936 B1 * | 9/2007 | Lee et al. | ................ | 360/78.05 |
| 2006/0245110 A1 * | 11/2006 | Hanchi et al. | ........... | 360/234.7 |

* cited by examiner

*Primary Examiner*—Fred F. Tzeng
(74) *Attorney, Agent, or Firm*—Ben J. Yorks; Irell & Manella LLP

(57) ABSTRACT

A hard disk drive that includes a voice coil motor and a micro-actuator. The micro-actuator is controlled by a servo that utilizes a micro-actuator calibration parameter. To compensate for temperature changes within the disk drive the micro-actuator calibration parameter is periodically updated.

16 Claims, 4 Drawing Sheets

FIG. 5
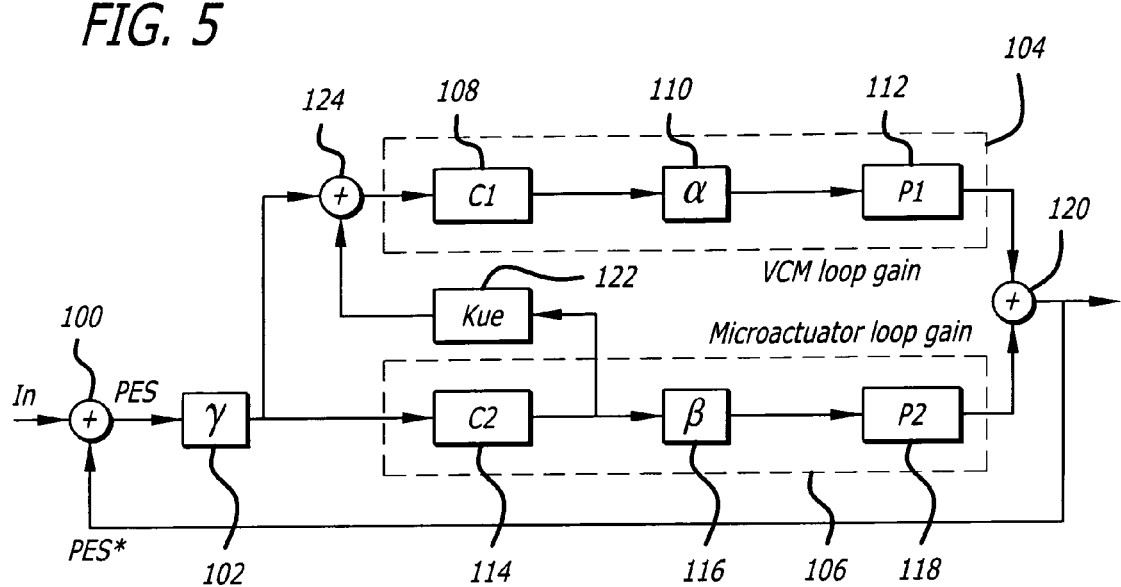
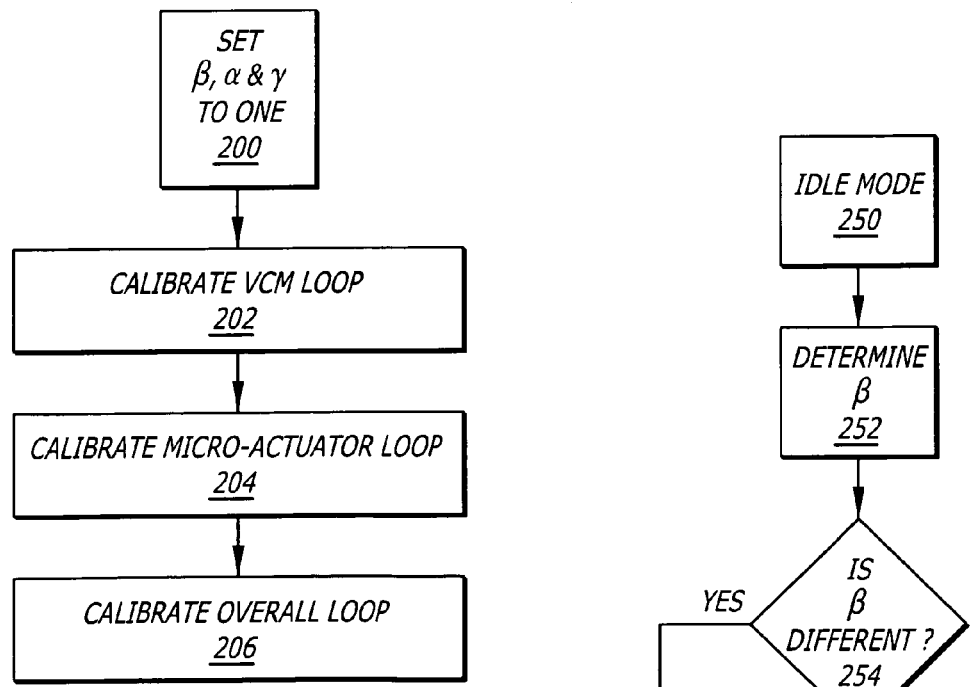
FIG. 6
FIG. 7

IN-SITU COMPENSATION METHOD OF MICROACTUATOR STROKE SENSITIVITY SUBJECT TO TEMPERATURE VARIATION

BACKGROUND OF THE INVENTION

1. Field of the Invention

The present invention relates to a servo routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A−B)−(C−D)) to create a position error signal ("PES"). The PES is used to create a drive signal for the voice coil motor to position the head on the track.

Some disk drives contain a micro-actuator that can provide micro-control of the head position. For hard drives with a micro-actuator the servo will have three loops. A loop for the voice coil motor, a loop for the micro-actuator and an overall loop for the system.

Each actuator loop may contain a calibration parameter that is used to tune the loop. For example, the micro-actuator loop includes a micro-actuator calibration parameter that is set to establish the gain of the micro-actuator.

The temperature of a hard disk drive may vary during operation of the drive. It has been observed that the stroke sensitivity of the micro-actuator may change with respect to temperature. For example, a temperature change of 0-60° C. can produce a variation of micro-actuator stroke sensitivity of +/−10%. To account for such temperature dependent stroke sensitivity the drive is typically tested in an "off-line" manufacturing station to determine different calibration parameters for a range of temperatures. The calibration parameters are then stored in a look-up table within the disk drive and used during operation of the drive. Having to create such a table off-line is time consuming and may not produce entirely accurate data.

BRIEF SUMMARY OF THE INVENTION

A hard disk drive that contains a voice coil motor and a micro-actuator. The hard disk drive includes a servo that utilizes a micro-actuator calibration parameter to control the micro-actuator. The micro-actuator calibration parameter is periodically modified during the operation of the disk drive.

BRIEF DESCRIPTION OF THE DRAWINGS

FIG. 5 is a schematic of a servo for the hard disk drive;

FIG. 6 is a flowchart showing a method for calibrating various calibration parameters of the servo;

FIG. 7 is a flowchart showing a method for modifying a micro-actuator calibration parameter during operation of the disk drive.

DETAILED DESCRIPTION

Described is a hard disk drive that includes a voice coil motor and a micro-actuator. The micro-actuator is controlled by a servo that utilizes a micro-actuator calibration parameter. To compensate for temperatures changes within the disk drive the micro-actuator calibration parameter is periodically updated.

Figure 2:
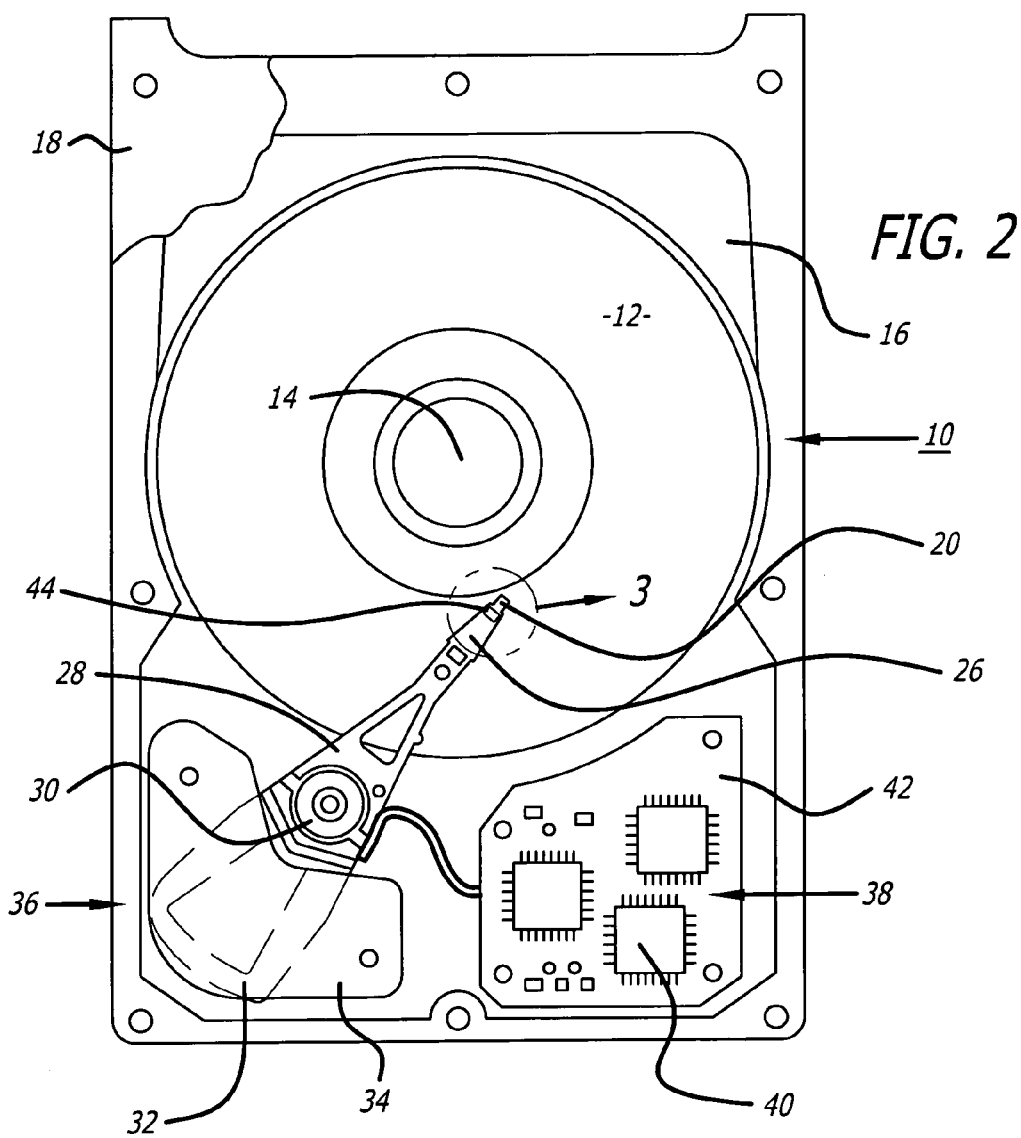
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
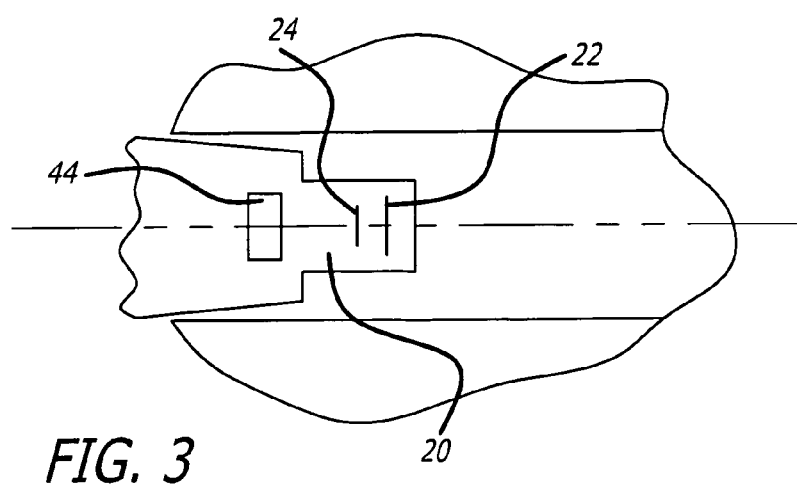
FIG. 3 is a top enlarged view of a head of the hard disk drive.

The disk drive 10 may include a plurality of heads 20 located adjacent to the disks 12. As shown in FIG. 3 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

The hard disk drive may include one or more micro-actuators 44 that are coupled to the suspension arms 26 and heads 20. By way of example, the micro-actuators 44 may include piezoelectric elements. The micro-actuators 44 can provide fine movement of the heads 20.

Figure 4:
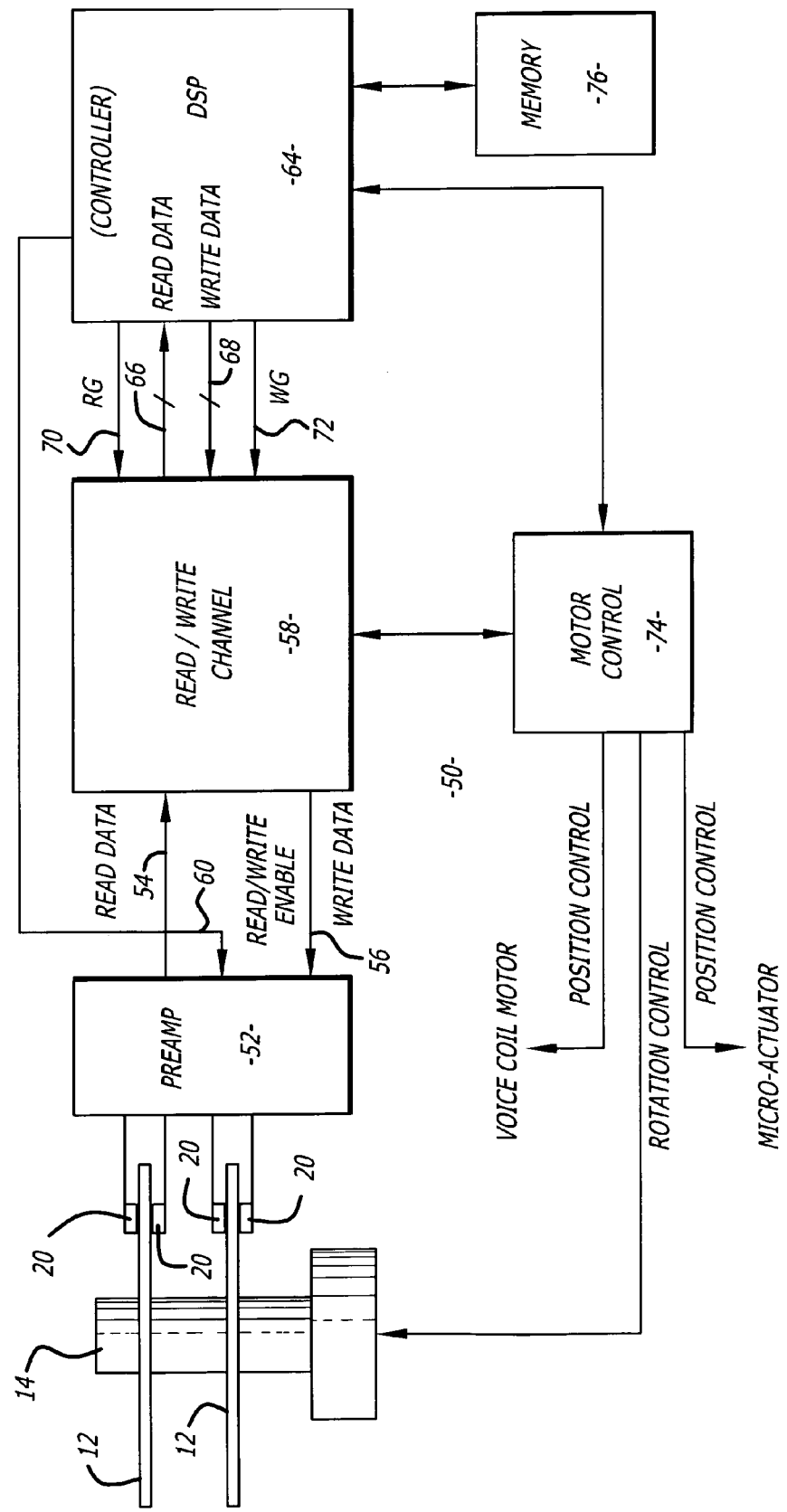
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36, spindle motor 14 and micro-actuator 44 of the disk drive 10. The controller 64 may be connected to a non-volatile memory device 76. By way of example, the device 76 may be a read only memory ("ROM") that contains instructions that are read by the controller 64.

Figure 1:
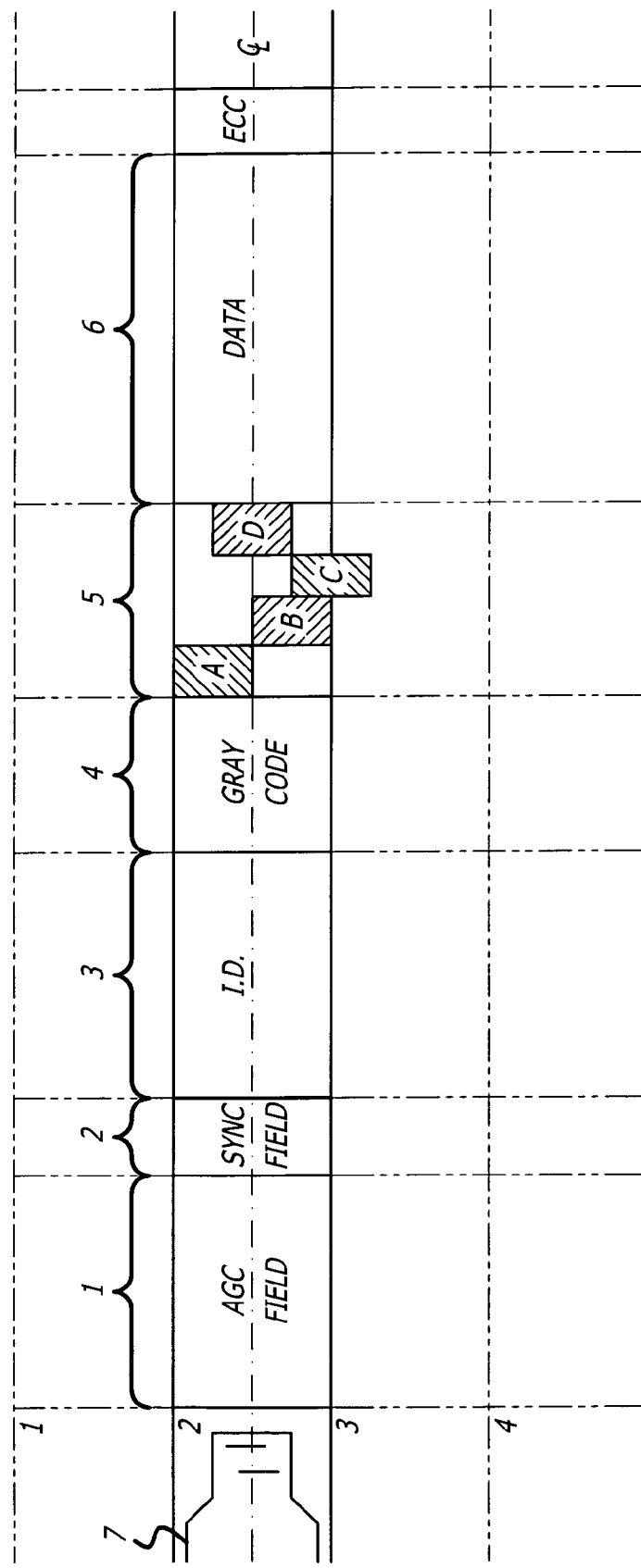
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

FIG. 5 shows a schematic of a servo used to position a head relative to a track of a disk. The process includes an adder 100 that adds a desired position value In with a measured position error signal PES* to create a position error signal PES. The PES is multiplied by a calibration parameter γ in block 102.

The servo includes a voice coil motor loop 104 and a micro-actuator loop 106. The voice coil motor loop 104 includes a controller block 108, a micro-actuator calibration parameter block 110 and a plant block 112. The controller block 108 represents the controller operating the servo of the voice coil motor. The plant block 112 represents the voice coil motor. The parameter block 110 contains a voice coil motor calibration parameter α that is used to tune the system.

The micro-actuator loop 106 has a controller block 114, a calibration parameter block 116 and a plant block 118. The plant 118 represents the micro-actuator. The controller block 114 represents the controller operating the servo of the micro-actuator. The parameter block 116 contains a micro-actuator calibration parameter β that is used to tune the system. The outputs of the voice coil loop 104 and the micro-actuator loop 106 are added by adder 120 which creates the measured PES*.

The servo may further have block 122 that provides feedback from the micro-actuator loop 104 to the voice coil loop 106 thru adder 124. The block 122 represents the micro-actuator sensitivity Kue.

The servo can be calibrated in accordance with the process shown in FIG. 6. In block 200 the calibration parameters β, α and γ may be set to 1. The micro-actuator sensitivity value Kue can be set to a nominal value.

The voice coil motor loop is calibrated in block 202. The voice coil loop may be calibrated by disabling the micro-actuator and injecting a sinusoidal signal with a frequency $W_0$ as the input to adder 100. A measured VCM loop gain Kvcm* can then be measured. The loop gain Kvcm* can be determined by the ratio of PES and PES*, closed loop transfer function, or other means. The measured loop gain Kvcm* is compared with a target design value for Kvcm. The target value may be C1*P1 or Kaug*C1*P1, where Kaug=(1+C1*Kue). The calibration parameter α can be determined from the ratio of Kvcm* and Kvcm.

The micro-actuator loop is calibrated in block 204. The micro-actuator loop may be calibrated by enabling the voice coil motor and the micro-actuator and measuring an overall gain Kdsa* with a sinusoidal input of frequency $W_0$ at adder 100. The micro-actuator gain Kpzt* can be determined from the difference of Kdsa* and Kvcm with their magnitude and phase information. The target desired Kpzt may be C2*P2. The calibration parameter β can be determined from the ratio of Kpzt* and Kpzt.

The overall loop can be calibrated in step 206. The overall loop can be calibrated by injecting a sinusoidal input with frequency $W_0$ into adder 100 and measuring a loop gain Kdsa. This process can be performed using the tuned gain parameters α and β. The measured Kdsa value can be compared with a target design value Kdsa to determine the overall calibration parameter γ.

The parameters α, β, and γ can be stored in memory. The process shown and described in FIG. 6 can be repeated under different conditions such as changing the frequency of the sinusoidal input signal.

FIG. 7 shows a process for updating the micro-actuator calibration parameter. The disk drive enters a idle mode in block 250. In block 252 a micro-actuator calibration parameter is determined. The micro-actuator calibration parameter can be determined by enabling the voice coil motor and the micro-actuator and measuring the overall gain Kdsa* with a sinusoidal input of frequency $W_0$ at adder 100. The micro-actuator gain Kpzt* can be determined from the difference of Kdsa* and Kvcm with their magnitude and phase information. The calibration parameter β can be determined from the ratio of Kpzt* and Kpzt.

In block 254 the micro-actuator calibration parameter is compared with a previously stored micro-actuator calibration parameter. If the new parameter value is different from the old value then the new micro-actuator calibration parameter is stored and used to tune the micro-actuator control loop in block 256. This process can be repeated periodically during the operation of the disk drive to compensate for temperature variations within the drive.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a head coupled to said disk;
   an actuator arm coupled to said head;
   a micro-actuator coupled to said head;
   a voice coil motor actuator coupled to said actuator arm; and,
   a servo circuit coupled to said voice coil motor and said micro-actuator, said servo circuit utilize a micro-actuator calibration parameter for said micro-actuator, said servo circuit periodically updates said micro-actuator calibration parameter during operation of the hard disk drive.

2. The hard disk drive of claim 1, wherein said micro-actuator calibration parameter is updated by comparing an actual micro-actuator loop gain value with a desired microactuator loop gain value and said micro-actuator calibration parameter as a ratio of said actual and desired micro-actuator loop gain values.

3. The hard disk drive of claim 1, wherein said micro-actuator calibration parameter is updated during an idle mode of the hard disk drive.

4. The hard disk drive of claim 1, wherein said micro-actuator calibration parameter is used to tune a micro-actuator loop gain of said micro-actuator.

5. The hard disk drive of claim 1, wherein said servo circuit includes a controller.

6. The hard disk drive of claim 1, wherein said servo circuit utilizes a voice coil motor calibration parameter for said voice coil motor actuator.

7. A hard disk drive, comprising:
- a disk;
- a head coupled to said disk;
- an actuator arm coupled to said head;
- a micro-actuator coupled to said head;
- a voice coil motor actuator coupled to said actuator arm; and,
- servo circuit means for controlling said micro-actuator using a micro-actuator calibration parameter, said servo circuit means periodically updates said micro-actuator calibration parameter during operation of the hard disk drive.

8. The hard disk drive of claim 7, wherein said micro-actuator calibration parameter is updated by comparing an actual micro-actuator loop gain value with a desired micro-actuator loop gain value and said micro-actuator calibration parameter is a ratio of said actual and desired micro-actuator loop gain values.

9. The hard disk drive of claim 8, wherein said micro-actuator calibration parameter is updated during an idle mode of the hard disk drive.

10. The hard disk drive of claim 8, wherein said micro-actuator calibration parameter is used to tune a micro-actuator loop gain of said micro-actuator.

11. The hard disk drive of claim 8, wherein said servo circuit includes a controller.

12. The hard disk drive of claim 8, wherein said servo circuit utilizes a voice coil motor calibration parameter for said voice coil motor actuator.

13. A method for updating a micro-actuator calibration parameter used to control a micro-actuator of a hard disk drive, comprising:
- determining a micro-actuator calibration parameter during operation of the hard disk drive;
- comparing the micro-actuator calibration parameter with a nominal micro-actuator calibration parameter; and,
- storing the micro-actuator calibration parameter if the micro-actuator calibration parameter deviates from the nominal micro-actuator calibration parameter.

14. The method of claim 13, wherein said micro-actuator calibration parameter is determined by comparing an actual micro-actuator loop gain value with a desired micro-actuator loop gain value and the micro-actuator calibration parameter is a ratio of the actual and desired micro-actuator loop gain values.

15. The method of claim 13, wherein the micro-actuator calibration parameter is updated during an idle mode of the hard disk drive.

16. The method of claim 13, further comprising tuning a micro-actuator control loop of the micro-actuator with the micro-actuator calibration parameter.

* * * * *